Figure 1:
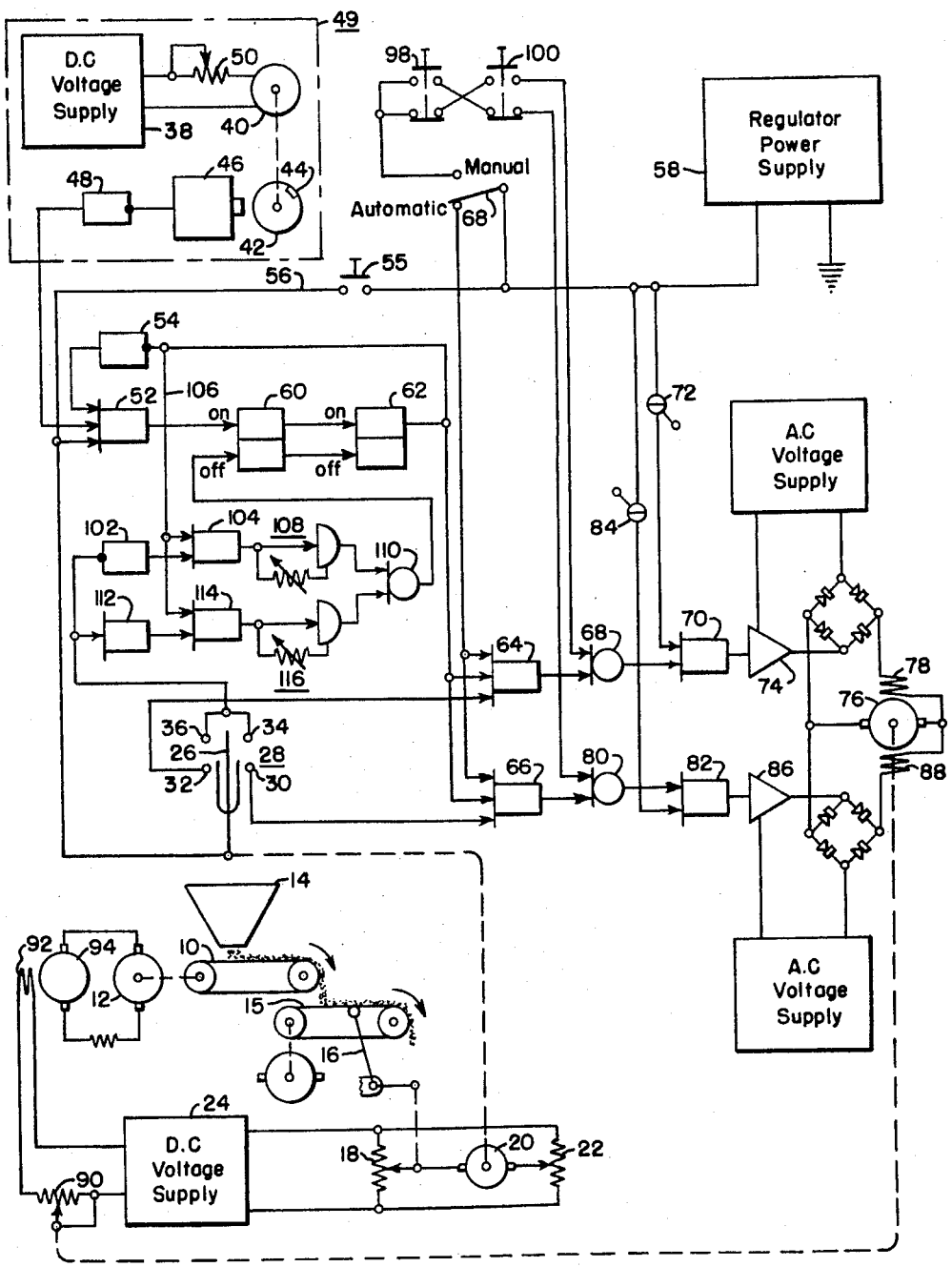

Nov. 17, 1959  H. A. DICKERSON  2,913,146
MOTOR CONTROL APPARATUS
Filed Sept. 24, 1957  2 Sheets-Sheet 1

WITNESSES:
Bernard R. Gieguey
Leon J. Faya

INVENTOR
Henry A. Dickerson
BY W.S.Brodahl
ATTORNEY

United States Patent Office 2,913,146
Patented Nov. 17, 1959

2,913,146

MOTOR CONTROL APPARATUS

Henry A. Dickerson, Snyder, N.Y., assignor to Westinghouse Electric Corporation, East Pittsburgh, Pa., a corporation of Pennsylvania Application September 24, 1957, Serial No. 685,907

11 Claims. (Cl. 222—55)

The present invention relates, in general, to control apparatus for a motor or like device, and more particularly to regulating control apparatus for a motor operative with a machine device such as a material handling device, for example a conveyor feeding material to a material treatment apparatus such as a furnace or the like.

It should be understood that the broad teachings of the present invention are applicable for controlling any variable parameter such as a voltage condition, speed, temperature and the like. The variable parameter is compared to a reference value or quantity for the purpose of regulating or varying the measured parameter in accordance with the reference, which in turn could be constant or variable in value.

It is an object of the present invention to provide improved regulating control apparatus, which apparatus provides an operation correction signal and applies it to correct the operation of a controlled device, such as a motor, in accordance with any error present between the actual operation of the device and a predetermined desired reference operation of said device.

It is another object of the present invention to provide improved regulating control apparatus for a device, which apparatus is operative to selectively increase or decrease a predetermined operating parameter of the device, for example speed, for a selective time period to better maintain the operation of the device in accordance with a predetermined desired operation.

It is a different object of the present invention to provide improved control apparatus for a device, for example a motor, which apparatus is operative to better control and maintain the operation of said device and thereby any apparatus associated with the device in accordance with a predetermined desired and reference operation.

It is an additional object of the present invention to provide improved control apparatus for a device, for example a motor, which apparatus is operative for discrete time periods or intervals having a duration in accordance with the magnitude of the error present in the operation of the device to better control and maintain the operation of the device to substantially eliminate any error between the actual operation of the device and a predetermined desired operation.

It is still another object of the present invention to provide improved control apparatus for a device, such as a motor, which apparatus is better operative to substantially maintain and control the operation of the device in accordance with a predetermined desired operation by providing an operation control signal and applying said signal to the device whenever an error in the operation of the device is present to be corrected and further by applying the control signal to the device for a time period dependent upon the magnitude of any such error.

Figure 2:
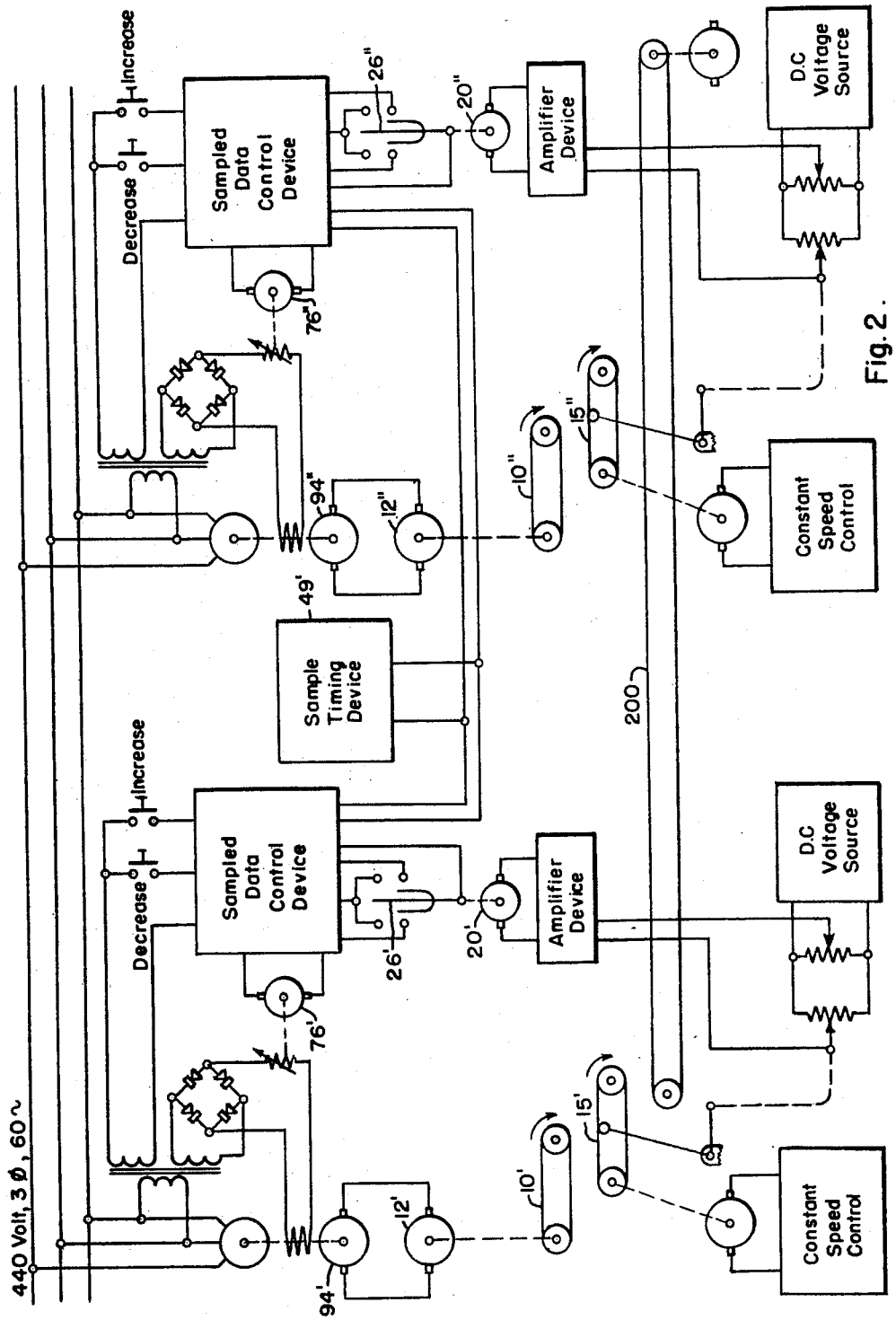

These and other objects and advantages of the present invention will become apparent in view of the following description taken in conjunction with the drawings, wherein:

Figure 1 is a schematic diagram of one modification of the present invention; and Fig. 2 is a schematic diagram illustrating a modification of the present invention.

In Fig. 1 there is shown a material handling conveyor 10 operative with a motor 12 for providing material from a hopper or the like 14 onto the conveyor 10 for supplying to a subsequent material handling conveyor 15 leading to a material utilization or treatment device, such as a sintering furnace or the like, not shown. The operation of the motor 12 regarding the speed of the conveyor 10 is operative to determine the amount of material supplied to the subsequent material handling conveyor 15 which operates at substantially constant speed. A material measuring or sensing member 16 is operative with an adjustable contact arm on a potentiometer 18 for controlling the operation of an error detecting device such as a motor 20 relative to the setting of a reference potentiometer 22. A direct current supply voltage 24 is connected to energize both of the potentiometer devices 18 and 22. The motor is operatively connected to a movable control arm 26 of an error sensing device 28 for determining the position of the control arm 26 relative to a first contact 30 operative with the control arm 26 when the material present on the conveyor 15 is greater than a predetermined desired or reference amount in accordance with the setting of the contact arm on the potentiometer 22. A second contact member 32 is operative with the control arm 26 when the material on the conveyor 15 as sensed by the member 16 is less than the predetermined desired amount of material in accordance with the setting of the contact arm on the reference potentiometer 22. In this regard, if it is desired that fifty units of material be present on the conveyor 15 and the contact arm of the potentiometer 22 is so set, then the contact 30 may be operative with the control arm 26 when fifty-one units are actually present on the conveyor 15 and it is desired to decrease the amount of material by the one unit of error relative to the predetermined desired amount of material on the conveyor 15. Further, the contact 32 may be operative with the control arm 26 when the amount of material actually present on the conveyor 15 is forty-nine units, and accordingly, it is desired to increase the amount of material by one unit. An additional pair of contacts 34 and 36 are operative with the control arm 26 when the amount of material on the conveyor 15 is either greater than the predetermined desired amount by a predetermined magnitude of error or is less than the predetermined desired amount. More specifically, if the amount of material actually on the conveyor 15 is in the order of fifty-five units or forty-five units for the fifty-five units of material actually on the conveyor, the contact 34 will be operative with the control arm 26 and for the forty-five units of material actually on the conveyor 15, the contact 36 will become operative with the control arm 26. In other words, the contacts 34 and 36 are operative to provide a high error control signal and each of the respective contacts 30 and 32 are operative to provide a low error control signal for correcting the operation of the motor 12 operative with the conveyor 10. In this regard the amount of material fed out of the hopper 14 is proportional to the speed of conveyor 10.

A direct current voltage supply 38, which may be the same supply as the direct current voltage supply 24, is operative with a motor 40 connected to a rotating member 42 including a magnetic insert 44 for movement relative to a proximity detector device 46, well known to persons skilled in this art, and including a coil having an inductive impedance which varies in accordance with the proximity of the magnetic insert 44 relative to the coil. Thusly, when the magnetic insert 44 is most closely adjacent to the coil within the proximity detector device 46, an output pulse is not provided by the latter device 46 to a Not device 48, such that when the pulse is not so provided, the Not device does have an output signal and when the pulse is provided by the proximity detector device 46, the Not device 48 does not have an output signal. In this regard, the operative speed of the motor 40 is adjustable by an impedance member 50 to thereby provide equally spaced control signals at equal time intervals determined by the rotating speed of the control member 42 and additionally determined by the number of magnetic members 44 provided on the rotating member 42. Thusly, the time intervals of the control signals received from the proximity detector device 46 may be adjusted by changing the number of magnets on the control member 42 and/or changing the operative speed of the control motor 40.

It should be here noted that the sequenced control signals may have time durations in accordance with the transport time delay of the system or apparatus controlled. More specifically, if error corrections that are made can be very rapidly sensed or measured, then a correspondingly short time period is needed for the sampling operation since the transport time delay period is short. Also, if this transport time delay period is of zero duration and does not exist as a delay at all, then a substantially continuous sampling operation may be employed.

A first And device 52 is provided with a plurality of inputs, each of which must be energized before the And device provides an output signal. In this regard, the timing control signals from the Not device 48 are applied to one input of the And device such that the And device 52 can have an output signal only when the Not device 48 is providing an output signal to one of the inputs of the And device 52. A second input of the And device 52 is energized through a Not device 54 when its input is not energized. A third input of the And device 52 is energized by a control lead 56 from a power supply 58. The output signal from the first And device 52 is operative to turn on a Flip-Flop or Memory device 60, and the output signal from the latter Flip-Flop device is operative to turn on a second Flip-Flop device 62.

The output signal from the latter second Flip-Flop device is connected to the input of the Not device 54 such that when the Flip-Flop 62 is providing an output signal, the Not device 54 will not have an output signal, and thusly, the first And device 52 will not have an output signal. The output signal from the Flip-Flop device 62 is also applied to an input of an And device 64 operative to increase a predetermined parameter of the motor 12 and as shown in Fig. 1, operative to increase the operating speed of the motor 12. Further, the latter output is applied to an input of an And device 66 operative to decrease the operating speed of the motor 12.

A second input of each of the And devices 64 and 66 is energized by a control switch member 68 when positioned in the automatic control position as shown in Fig. 1.

A third input of the And device 64 is energized by the contact 32 when the amount of material actually on the conveyor 15 as sensed by the member 16 is less than the predetermined desired amount of material on the conveyor 15. A third input of the And device 66 is energized by the contact 30 when the amount of material actually on the conveyor is greater than the predetermined desired amount of material in accordance with the setting of the contact arm on the reference potentiometer 22. When all of the inputs of the And device 64 have been energized, it is operative to provide an output signal through an Or device 68 to energize one input of an additional And device 70. A second input of the And device 70 is operative with a limit switch 72 which opens when the feeder motor 12 has moved to its maximum increase travel position. Thusly, the And device 70 is operative to provide an output signal through an amplifier 74 to energize the armature circuit of the control motor 76 having an increase direction field winding 78 whenever the contact 32 is energized by the control arm 26 and further, until the limit switch 72 is opened by the feeder motor 12 or some movable speed controlling component in the control circuit for the motor 12 moving to its maximum increase material feed position.

The output of the And device 66 is operative through a second Or circuit or device 80 for energizing one input of an And device 82 having a second input controlled by a maximum decrease travel position limit switch 84 operative with the feeder motor 12 with the output from the And device 82 passing through an amplifier 86 for energizing the control motor 76 and a decrease direction control field winding 88. The control motor 76 is operative with an adjustable impedance member 90 connected in series with a field winding 92 for a supply generator 94 operative with the feeder motor 12, as shown in Fig. 1.

If it is desired to manually control the operation of the feeder motor 12, the selector switch 68 may be positioned in the manual direction and either a decrease controlling switch member 98 may be operated or an increase direction controlling switch member 100 may be operated for controlling through the respective Or devices 68 and 80, the increase direction operation of the feeder motor 12 or the decrease direction operation of the feeder motor 12 as shown in Fig. 1.

The time duration of the output control signal from the Flip-Flop device 62 is determined by the high error control signal received from one of the contacts 34 or 36. If such a signal is not present, the Not device 102 is operative to provide an output signal to the And device 104 in conjunction with the output signal from the Flip-Flop device 62 received through the conductor 106 such that the And device has an output signal passing through an adjustable time delay device 108 which is operative to provide an output signal after its time delay period has expired through the Or device 110 to the off input of the Flip-Flop device 60 to, in turn, provide an off control signal to the off input of the Flip-Flop device 62 and terminate the control signal received from the Flip-Flop device 62.

On the other hand, if a high error signal is received from one of the contacts 34 or 36, the Not device 102 does not have an output signal since its input is energized, but the single input And device 112 has an output signal which passes through the And device 114 through a second time delay device 116 having a longer time delay period than the first time delay device 108, such that after said longer time delay period an output control signal is provided for the Or device 110 to terminate the operation of the Flip-Flop device 60 and, in turn, the Flip-Flop device 62.

In Fig. 2 there is illustrated a modification of the present control apparatus for controlling the amount of flue dust as well as the fuel for supply to a sinter furnace. In this regard, the flue dust feeder is operative to provide material onto a common conveyor 200 as is the fuel feeder for supplying a sintering furnace or the like. The apparatus as shown in Fig. 2 is similarly operative relative to the apparatus as shown in Fig. 1.

In Fig. 2, the respective control elements corresponding to those shown in Fig. 1 have been designated with primed numbers. More specifically, the flue dust feeder control apparatus has single primed numerals, and the fuel feeder control apparatus has double primed numerals. It should be understood that additional control systems as shown in Fig. 1 can be provided for each of any desired number of additional materials to be supplied to the sinter furnace, and similar as the two such systems shown in Fig. 2.

Many closed loop regulating systems are characterized by appreciably long time intervals or delays between the time that a change is made in the controlled quantity and the time that this change can be detected. Such intervals are known as transport, storage and reaction time delays. Systems involving such delays can be controlled by a sampled data regulator in accordance with the present control apparatus. Such a regulating system includes an error detector, a sampling interval timer and a cycling control in addition to a device to accept signals from the cycling control and to make changes in the controlled quantity. The error detector compares some measured quantity with a reference quantity, and when the controlled quantity varies from the reference by more than a predetermined fixed amount, furnishes error signals, either high or low, to the cycling control device. The latter predetermined fixed amount can be utilized as a null band such that nominal variations of the controlled quantity can be set to occur within the range of said null band. The cycling interval timer turns on or energizes the cycling control periodically. Thusly, the cycling control, when turned on, accepts signals from the error detector and, if an error signal exists, sends a short duration signal to cause the controlled quantity to be changed a small amount in the proper direction to reduce the error existing in the measured amount as compared to the reference amount of material. For stability with such a regulator, the interval between sampling periods should be long enough for any change in the controlled quantity to be detected by the error detector, and the amount of change each sampling period should be small enough not to cause the controlled quantity to change from high to low or conversely per sampling period when an error exists. Thusly, the amount of change per each period is predetermined to not be large enough to cause the error detector to swing across its null zone or control band.

In the operation of the present control apparatus, additional high error control signals are provided by the error detector when a high error greater than a predetermined amount exists to result in larger corrective steps until the high error disappears. Thereafter, the regulator transfers back to the short corrective steps for slow entry into the control zone without overshoot. Thusly, the larger correction for high errors allows a faster response by the subject control apparatus.

In the operation of the subject control apparatus, the Flip-Flop device 62 turns on in accordance with the timing intervals provided by the timer device 49. When turned on, the Flip-Flop device 62 is operative to provide error correction signals in conjunction with the detector device 28. Thusly, if a small error exists in the actual amount of material present on the conveyor 15 as compared to a predetermined desired or reference quantity of material as set on the potentiometer 22, the control motor 76 receives a control signal to either decrease or increase as required to correct the small error in the controlled quantity as measured by the sensing device 16. If a larger error exists, either high or low, the control motor 76 receives the control signal to correct for the error and stays on for a longer adjustable time interval as determined by the time delay 116 to thereby allow the increase or decrease error correction signal to be maintained relative to the control motor 76 for a longer period of time to thus allow a larger change and consequent faster error correction of the material on the conveyor 15.

In this regard, it should be understood that the control motor 76 can be used to drive a rheostat as shown in Fig. 1, or instead, can be used to control a material flow valve or any other device that can be positioned to control the amount of material to be regulated relative to the conveyor 15. The output signals from the cycling control will run the control motor 76 in either a forward or a reverse direction to change the position of the driven rheostat 90 or change the opening of a valve or other control means. In the apparatus as shown in Fig. 1, the rheostat 90 is operative to control the speed of the feeder drive motor 12 and hence the flow of material from the hopper 14 and the conveyor 10 onto the constant speed conveyor 15.

In the operation of the control apparatus as shown in Fig. 1, the sampling interval timer 49 supplies a periodic input signal to And device 52. If the Flip-Flop 62 is not turned on, the Not device 54 provides a control signal to a second input of And device 52 and the regulator power supply 58 supplies a third control signal to an input of the And device 52 when the On controlling button 55 or start button 55 is closed. When the And device 52 conducts, it supplies a control signal to turn on the Memory or Flip-Flop 60. The output from the Memory 60 turns on the second Memory or Flip-Flop 62, and the output from the latter Memory 62 turns off the Not device 54 by energizing its input to thusly terminate its output signal to the input of the And device 52 leading to the On input of the Flip-Flop 60. The output signal from the Flip-Flop 62 continues until the Flip-Flop 62 is turned off by its Off input being energized. The output signal from the Flip-Flop 62 is supplied to one input of each of the And devices 64 and 66. A second input of each of these And devices is energized if the selector switch 68 is in the automatic control position, as shown in Fig. 1. The error detector 28 is operative to provide an increase control signal to the And device 64 if the material on the conveyor 15 as sensed by the member 16 is less than a predetermined desired amount of material and the error detector 28 is operative to provide a decrease control signal to the And device 66 if the amount of material on the conveyor 15 as sensed by the member 16 is greater than a predetermined desired amount of material. Thusly, the And device 64 is operative to control the control motor 76 in a direction to increase the amount of material supplied to the conveyor 15 as controlled by the feeder motor 12 operative with the conveyor 10. Similarly, the And device 66 is operative to decrease the amount of material supplied to the conveyor 15.

The output control signal from the Memory or Flip-Flop device 62 supplies one input to each of the And devices 64 and 66, and thusly, these latter devices can have an output signal to control the operation of the split series field control motor 76 only during the interval of time that the Flip-Flop device 62 is conducting and turned on. If, during this interval of time, the error detector 28 is operative with the contactor 32 to provide an increase control signal, the control motor 76 is operated during this time interval in an increase direction during the portion of each sampling time period that the Flip-Flop 62 is turned on. If, instead, the error detector 28 is operative to provide a decrease control signal from the contactor 30, the And device 66 is energized to operate the control motor 76 in the opposite or decrease material supplied to the conveyor 15 direction during the sampling intervals that the Flip-Flop 62 is also conductive.

If the high error signal as received through one of the contacts 34 or 36 is also provided by the error detector 28 in addition to one of the increase control signal from the contactor 32 or the decrease control signal from the contact 30, the portion of each sampling time or interval that the Flip-Flop 62 is on is increased by the operation of the time delay device 116 to allow the split series field control motor 76 to be operated for a longer period of time, and thusly, make a larger change in the controlled quantity of material supplied to the conveyor 15 as controlled by the feeder motor 12 operative with the conveyor 10.

The output signal from the Flip-Flop device 62 is applied to one input of each of the And devices 104 and 114. If the error detector 28 is not providing a high error signal, the Not device 102 will have an output signal to energize the second input of And device 104 and thusly energize through the shorter period time delay device 108 and Or device 110 the Off input of Flip-Flop 60 and hence the Off input of Flip-Flop 62. However, if a high error signal is provided, the Not device 102 will not have an output and instead the single input And device 112 will be energized to provide an output signal to the second input of And device 114. This energizes through the longer period time delay device 116 the Off input of Flip-Flop 60 and hence the Off input of Flip-Flop 62 to stop the sample period.

Although the present invention has been described with a certain degree of particularity, it should be understood that the present disclosure has been made only by way of example and that numerous changes in the details of construction and the combination and arrangement of parts may be resorted to without departing from the scope and the spirit of the present invention.

I claim as my invention:

1. In control apparatus for a motor operative with a machine device for controlling a predetermined operating condition of said machine device, the combination of a condition sensing member operative with said machine device and responsive to the actual operating condition of said machine device, error sensing apparatus operative with said condition sensing member for providing a first control signal that varies in accordance with a predetermined relationship between said actual operating condition of said machine device and a predetermined desired operating condition of said machine device, an error correction signal source operative to provide a second control signal having a controlled time duration for correcting the operation of said motor, and motor operation correction apparatus operative with said motor and responsive to said first control signal for controlling the supply of said second control signal during said time duration to said motor.

2. In control apparatus for a motor operative with a machine device, the combination of an operating condition sensing means operative with said machine device and responsive to a predetermined actual operating condition of said machine device, error sensing apparatus operative with said condition sensing means for providing a first control signal that varies in accordance with a predetermined relationship between said actual operating condition of said machine device and a predetermined desired operating condition of said machine device, a correction signal source operative to provide a second control signal having a controlled time duration for correcting the operation of said motor and in accordance with a second predetermined operating condition of said machine device, and motor operation correction means operative with said motor and including a control member for providing an output signal and having at least a first input and a second input that must be simultaneously energized before said output signal is provided, with said first input being responsive to said first control signal and with said second input being responsive to said second control signal, and with said control member output being connected to control the operation of said motor.

3. In control apparatus for a motor operative with a material handling device, the combination of material measuring means operative with said material handling device and responsive to the amount of material actually handled by said device, an error sensing apparatus operative with said material measuring means for providing a first control signal that varies in accordance with the error between the amount of material actually handled by said device and a predetermined desired amount of material to be handled by said device, a timer device for providing discrete sample intervals, an error correction signal source operative with said timer device for providing a second control signal during each of said sample intervals for correcting the operation of said motor, and a motor operation correction apparatus operative with said motor and responsive to said first control signal for controlling the supply of said second control signal to said motor.

4. In control apparatus for a motor operative with a material handling device, the combination of a material measuring member operative with said material handling device and responsive to the amount of material actually present on a predetermined portion of said device, an error sensing apparatus operative with said material measuring member for providing a first control signal that varies in accordance with the difference between the amount of material actually present on said portion of said device relative to a predetermined desired amount of material to be present on said portion of said device, an error correction signal source operative to provide a second control signal having a controlled time duration for correcting the operation of said motor, and a motor operation correction apparatus operative with said motor and responsive to each of said first control signal and said second control signal for controlling the operation of said motor during the time duration of said second control signal.

5. In control apparatus for a motor operative with a material handling device, the combination of material measuring means operative with said material handling device and responsive to the amount of material actually handled by said device, an error sensing apparatus operative with said material measuring means for providing a first control signal that has a value in accordance with the error between the amount of material actually handled by said device and a predetermined desired amount of material to be handled by said device, an error correction signal source operative to provide a second control signal for having a controlled time duration for correcting said error by correcting the operation of said motor, and a motor operation correction apparatus operative with said motor, with said motor operation correction apparatus having at least two inputs and an output and with each of said inputs requiring energization before said output is energized, with one of said inputs being energized by said first control signal and another input being energized by said second control signal, and with said output being operative to control the operation of said motor during said time duration and when each of said inputs are energized.

6. In control apparatus for a motor operative with a material handling device, the combination of material measuring means operative with said material handling device and responsive to the amount of material actually handled by said device, an error sensing apparatus operative with said material measuring means for providing a first control signal that has a value in accordance with a predetermined relationship between the amount of material actually handled by said device and a predetermined desired amount of material to be handled by said device, a timer device for providing periodic sample control time intervals, an error correction signal source operative with said timer device for providing an error correction signal having a predetermined value during each of said time intervals, and a motor operation correction apparatus operative with said motor, with said motor operation correction apparatus including a control device having at least two inputs and an output and with said output being energized only when each of said inputs is simultaneously energized, with one of said inputs being responsive to said first control signal and another of said inputs being responsive to said error correction signal, and with said output being connected to control the operation of said motor and thereby the operation of said material handling device.

7. In control apparatus for a motor operative with a material handling device, the combination of a material measuring member operative with said material handling device and responsive to the amount of material actually handled by said device, an error sensing apparatus operative with said material measuring member for providing at least one of a first control signal and a second control signal, with each of said first and second control signals having a predetermined value depending upon the difference between the amount of material actually handled by said device and a predetermined desired amount of material to be handled by said device, a timer device for providing sample control signals at discrete intervals of time, an error correction signal source operative with said timer device and responsive to said sample control signals for providing a third error correction control signal during each of said time intervals for correcting the operation of said motor, with said error correction signal source being responsive to one of said first and second control signals for determining the time duration of said third control signal, and motor operation correction apparatus operative with said motor and responsive to the other of said first control signal and said second control signal for controlling during said time duration the supply of said third error correction control signal to said motor.

8. In control apparatus for a motor operative with a material handling device, the combination of a material measuring member operative with said material handling device and responsive to the amount of material actually handled by said device, an error sensing apparatus operative with said material measuring member for providing at least one of a first control signal that varies in accordance with a first predetermined error relationship between the amount of material actually handled by said device and a predetermined desired amount of material to be handled by said device and a second control signal that varies in accordance with a similar second predetermined and greater error relationship, an error correction signal source operative to provide a third error correction control signal having a controlled time duration for correcting the operation of said motor, a first timer device operative with said signal source for providing said third control signal at discrete periods of time, a second timer device responsive to said second control signal for controlling the time duration of said third control signal, and motor operation correction apparatus operative with said motor and responsive to said first control signal and said third control signal for controlling the operation of said motor during said time duration to correct for any error between the amount of material actually handled by said device and said predetermined desired amount of material.

9. In apparatus for controlling a variable value parameter, the combination of a parameter sensing member responsive to the actual value of said parameter, error sensing apparatus operative with said sensing member for providing a first control signal that varies in accordance with a predetermined relationship between the actual value of said parameter and a predetermined desired value for said parameter, an error correction signal source operative to provide a second control signal having a controlled time duration for correcting the value of said parameter, and error correction apparatus operative to control the value of said parameter and responsive to both of said first control signal and said second control signal for controlling the value of said parameter during the time duration of said second control signal.

10. In apparatus for controlling the value of a variable parameter, the combination of parameter value sensing means responsive to the actual value of said parameter, error sensing apparatus operative with said sensing means for providing a first control signal that varies in accordance with a predetermined relationship between the actual value of said parameter and a predetermined desired value for said parameter, an error correction signal source operative to provide a second control signal having a controlled time duration for correcting the value of said parameter, and error correction means operative with said signal source and said sensing means and including a control member having an output and at least a first input and a second input that must be simultaneously energized before said output is energized, with said first input being responsive to said first control signal and with said second input being responsive to said second control signal, and with said control member output being connected to control the value of said parameter.

11. In control apparatus for controlling the value of a variable parameter, the combination of parameter value measuring means responsive to the actual value of said parameter, an error sensing apparatus operative with said measuring means for providing a first control signal that varies in accordance with a predetermined relationship between the actual value of said parameter and a predetermined desired value for said parameter, a timer device for providing discrete sample intervals of time, an error correction signal source operative with said timer device for providing a second control signal during each of said sample intervals of time for correcting the value of said parameter, and correction apparatus operative with said signal source and said error sensing apparatus for controlling the value of said parameter in accordance with said first control signal and said second control signal.

References Cited in the file of this patent

UNITED STATES PATENTS

| | | |
|---|---|---|
| 2,209,926 | McGrath | July 30, 1940 |
| 2,367,775 | Hohman | Jan. 23, 1945 |
| 2,636,692 | Picking | Apr. 28, 1953 |
| 2,662,665 | Harper | Dec. 15, 1953 |